(12) United States Patent
Sundblad et al.

(10) Patent No.: US 10,974,490 B2
(45) Date of Patent: *Apr. 13, 2021

(54) LARGE LIGHTWEIGHT COFFIN AND METHOD FOR ITS MANUFACTURE

(71) Applicant: OrganoClick AB, Täby (SE)

(72) Inventors: Per Sundblad, Gothenburg (SE); Torbjörn Hansson, Vallentuna (SE); Tommy Ollevik, Segeltorp (SE); Mårten Hellberg, Stockholm (SE)

(73) Assignee: ORGANOCLICK AB, Täby (SE)

( * ) Notice: Subject to any disclaimer, the term of this patent is extended or adjusted under 35 U.S.C. 154(b) by 60 days.

This patent is subject to a terminal disclaimer.

(21) Appl. No.: 15/738,873

(22) PCT Filed: Jun. 23, 2016

(86) PCT No.: PCT/SE2016/050628
§ 371 (c)(1),
(2) Date: Dec. 21, 2017

(87) PCT Pub. No.: WO2016/209158
PCT Pub. Date: Dec. 29, 2016

(65) Prior Publication Data
US 2018/0177661 A1    Jun. 28, 2018

(30) Foreign Application Priority Data
Jun. 23, 2015   (SE) ...................................... 1550867

(51) Int. Cl.
*B32B 29/00*       (2006.01)
*A61G 17/007*     (2006.01)
(Continued)

(52) U.S. Cl.
CPC ............ *B32B 29/00* (2013.01); *A61G 17/004* (2016.11); *A61G 17/0073* (2013.01); *B32B 1/02* (2013.01);
(Continued)

(58) Field of Classification Search
CPC ................ A61G 17/007; A61G 17/004; A61G 17/0073; A61G 17/044; B32B 1/02;
(Continued)

(56) References Cited

U.S. PATENT DOCUMENTS

| 293,220 A | 2/1884 | Bodge |
| 528,612 A * | 11/1894 | Shaw ..................... D21H 17/28 |
| | | 162/175 |

(Continued)

FOREIGN PATENT DOCUMENTS

| CN | 1274029 A | 11/2000 |
| CN | 1827485 A | 9/2006 |

(Continued)

OTHER PUBLICATIONS

U.S. Appl. No. 15/738,802, filed Dec. 21, 2017, Per Sundblad et al.
(Continued)

*Primary Examiner* — William L Miller
(74) *Attorney, Agent, or Firm* — Faegre Drinker Biddle & Reath LLP

(57) ABSTRACT

A large lightweight molded coffin comprises a large pulp molded outer shell lined with a reinforcing spacer material such as single faced Re-board®, a honeycomb structure or a molded spacer material conforming to and adhering to said shell and an inner shell made of molded pulp or a paper based material. A method for manufacturing such a lightweight coffin involves pressing slurried pulp between a first male mold half covered with elastomeric material and a second female mold half, to form the molded pulp shell, and (Continued)

gluing the reinforcing spacer material to the interior of said outer molded pulp shell and the inner shell.

12 Claims, 3 Drawing Sheets

(51) Int. Cl.
| | |
|---|---|
| *B32B 1/02* | (2006.01) |
| *B32B 3/12* | (2006.01) |
| *D21J 3/00* | (2006.01) |
| *D21J 7/00* | (2006.01) |
| *A61G 17/00* | (2006.01) |
| *B32B 7/12* | (2006.01) |
| *B32B 3/28* | (2006.01) |
| *B32B 29/08* | (2006.01) |
| *B32B 37/12* | (2006.01) |
| *B32B 37/18* | (2006.01) |

(52) U.S. Cl.
CPC ............... *B32B 3/12* (2013.01); *B32B 3/28* (2013.01); *B32B 7/12* (2013.01); *B32B 29/005* (2013.01); *B32B 29/08* (2013.01); *B32B 37/1284* (2013.01); *B32B 37/18* (2013.01); *D21J 3/00* (2013.01); *D21J 7/00* (2013.01); *B32B 2250/03* (2013.01); *B32B 2250/26* (2013.01); *B32B 2255/12* (2013.01); *B32B 2262/0276* (2013.01); *B32B 2262/04* (2013.01); *B32B 2262/062* (2013.01); *B32B 2262/067* (2013.01); *B32B 2305/024* (2013.01); *B32B 2307/3065* (2013.01); *B32B 2307/546* (2013.01); *B32B 2307/73* (2013.01); *B32B 2307/732* (2013.01); *B32B 2439/00* (2013.01)

(58) Field of Classification Search
CPC .... B32B 3/12; B32B 3/28; B32B 7/12; B32B 29/00; B32B 29/005; B32B 29/08; B32B 37/1284; B32B 37/18; B32B 2250/03; B32B 2250/26; B32B 2255/12; B32B 2262/0276; B32B 2262/04; B32B 2262/062; B32B 2262/067; B32B 2305/024; B32B 2307/3065; B32B 2307/546; B32B 2307/73; B32B 2307/732; B32B 2439/00; B32B 1/00; B32B 3/26; D21J 3/00; D21J 7/00
USPC ............... 27/2, 3, 4, 13, 19; 229/400, 406; 162/218, 231
See application file for complete search history.

(56) References Cited

U.S. PATENT DOCUMENTS

| | | | |
|---|---|---|---|
| 1,551,257 A | 8/1925 | Little | |
| 2,518,164 A | 8/1950 | Meyer | |
| 3,250,668 A | 5/1966 | Modersohn | |
| 4,014,739 A | 3/1977 | Granberg | |
| 4,034,447 A * | 7/1977 | Kollmann | A61G 17/00 27/7 |
| 4,162,935 A | 7/1979 | Kollmann et al. | |
| 5,272,852 A | 12/1993 | Fortin et al. | |
| 5,603,808 A | 2/1997 | Nishikawa | |
| 5,656,135 A | 8/1997 | Baker | |
| 5,771,549 A | 6/1998 | Saaf | |
| 6,149,845 A * | 11/2000 | Ren | D21J 3/10 162/220 |
| 6,245,199 B1 | 6/2001 | Lee | |
| 6,421,957 B1 | 7/2002 | Hasegawa et al. | |
| 8,151,421 B2 * | 4/2012 | Hsu | A61G 17/0073 229/125.38 |
| 10,711,404 B2 | 7/2020 | Sundblad et al. | |
| 2001/0001409 A1 | 5/2001 | Weight et al. | |
| 2004/0013830 A1 * | 1/2004 | Nonomura | B32B 1/02 428/34.2 |
| 2004/0084165 A1 * | 5/2004 | Shannon | D21H 17/59 162/158 |
| 2004/0084166 A1 | 5/2004 | Nonomura et al. | |
| 2010/0009104 A1 | 1/2010 | Greelis et al. | |
| 2010/0075120 A1 * | 3/2010 | Gustafsson | B32B 5/26 428/196 |
| 2012/0042488 A1 * | 2/2012 | Hsu | A61G 17/0073 27/4 |
| 2013/0112361 A1 * | 5/2013 | Mikami | D21F 1/0063 162/202 |
| 2018/0171561 A1 * | 6/2018 | Sundblad | B32B 29/08 |
| 2018/0177661 A1 | 6/2018 | Sundblad et al. | |
| 2018/0187379 A1 | 7/2018 | Sundblad et al. | |
| 2019/0169800 A1 | 6/2019 | Hardacre et al. | |

FOREIGN PATENT DOCUMENTS

| | | | |
|---|---|---|---|
| DE | 19922785 A1 | 11/2000 | |
| EP | 0466653 A1 | 1/1992 | |
| EP | 0719894 A2 | 7/1996 | |
| EP | 1085127 A2 | 3/2001 | |
| EP | 1197596 A1 | 4/2002 | |
| EP | 2 563 311 A1 | 3/2013 | |
| GB | 10669 | 7/1894 | |
| GB | 253179 A | 6/1926 | |
| GB | 2448592 A | 10/2008 | |
| JP | H09117480 A | 5/1997 | |
| JP | H09-195200 A | 7/1997 | |
| JP | 2000237251 A * | 9/2000 | |
| JP | 2002-180400 A | 6/2002 | |
| JP | 2005-278923 A | 10/2005 | |
| JP | 2011-110125 A | 6/2011 | |
| JP | 2011-527650 A | 11/2011 | |
| JP | 3178946 U | 10/2012 | |
| KR | 20080103694 A * | 11/2008 | |
| RU | 68831 | 12/1947 | |
| SE | 529897 C2 | 12/2007 | |
| WO | WO-98/11194 A1 | 3/1998 | |
| WO | WO-99/22069 A1 | 5/1999 | |
| WO | WO-2006/016072 A2 | 2/2006 | |
| WO | WO-2011/134479 A1 | 11/2011 | |
| WO | WO-2018037251 A1 * | 3/2018 | ......... A61G 17/0106 |

OTHER PUBLICATIONS

U.S. Appl. No. 15/738,733, filed Dec. 21, 2017, Per Sundblad et al.
Extended European search report issued in European patent application No. 16 81 4818.7, dated Jan. 7, 2019.
Extended European search report issued in European patent application No. EP16814816.1, dated Mar. 26, 2019.
Database WPI, Week 200776, Thomson Scientific, London, GB; AN 2007-805856, XP002789575.
Anonymous: "Re-board, Boundless Imagination with Reboard", Re-board Technology, Mar. 8, 2019 (Mar. 8, 2019); CP002789576, retrieved from the internet: URL:https://reboard.se/re-board/ [retrieved on Mar. 8, 2019].
Swedish Office Action dated Feb. 1, 2016 for Swedish Application No. 1550866-6.
Swedish Office Action dated Jan. 22, 2016 for Swedish Application No. 1550864-1.
Extended European search report dated Mar. 1, 2019 issued in European patent application No. 16814817.9.
Russian Office Action issued in Russian patent application No. 217144082/05(075691) dated Aug. 21, 2019 (7 pages) and its English-language translation thereof (5 pages).
Swedish Office Action dated Feb. 1, 2016 for Swedish Application No. 1550867-4.
U.S. Office Action dated Jan. 31, 2020 that issued in U.S. Appl. No. 15/738,802 including Double Patenting Rejections on pp. 2-4.

(56) References Cited

OTHER PUBLICATIONS

Indian Examination Report dated Sep. 7, 2020 issued in Indian patent application No. 201717045631.

* cited by examiner

LARGE LIGHTWEIGHT COFFIN AND METHOD FOR ITS MANUFACTURE

CROSS-REFERENCE TO PRIOR APPLICATION

This application is a § 371 National Stage Application of PCT International Application No. PCT/SE2016/050628 filed Jun. 23, 2016, which claims priority to Swedish Patent Application No. 1550867-4 filed Jun. 23, 2015, each of which are herein incorporated by reference in their entirety.

TECHNICAL FIELD

Generally, embodiments herein relate to large lightweight coffins, and to methods of making such molded containers.

BACKGROUND

Pulp molding is known in the art for producing small packages such as egg cartons, disposable food dishes, box inserts and other protective packing materials etc.

RELATED ART

U.S. Pat. No. 6,245,199 describes a method of pulp molding trays where the starting material is a suspension containing cellulose fibers. The male mold half is dipped in a bath of the suspension, and the mold halves are then pressed together under heat and pressure.

SE 529 897 C2 describes the pulp molding of a tray where a dewatering receptacle is used to shape a tray of pulp which is then transferred to a compression tool where the tray is subjected to pressure and heat. It involves a transfer step and is not readily usable for large containers.

Large containers with smooth surfaces and strong, lightweight structure have been very difficult to pulp mold. And a complex of difficult to solve problems have prevented widespread use of pulp molding to produce lightweight coffins.

EP 0466653, for example, describes a coffin made of molded pulp without any reinforcing spacer lining. Upper and lower coffin halves are pulp molded with integral ribs 44, 46 for reinforcement. These prevent a finished smooth surface and do not permit forming into a classic attractive coffin shape, with gently curved smooth walls.

U.S. Pat. No. 4,162,935 also describes a coffin made of dewatered paper pulp. The mold also provides integral ribs 20, for reinforcement, which prevent having a finished smooth surface and a classic coffin shape.

WO06016072 describes boards or panels consisting of honeycomb layers with paper sheet faces and possibly polyurethane coating. One possible mentioned use of this honeycomb board is for constructing a lightweight and inexpensive coffin.

GB-2448592 describes a coffin made of sandwich honeycomb paperboard panels, which can be covered with veneer or other material to give the appearance of wood.

However, none of the related art discloses or hints at how to achieve the solutions provided by embodiments herein.

OBJECT OF THE INVENTION

Embodiments herein intends to solve a complex of difficult-to-reconcile interrelated problems still present in the designs of the prior art:

It has been very difficult to use existing pulp molding methods to produce very large objects. This is due partially to the problem of thermal expansion and contraction of the two metal mold halves used in the compression of the pulp in the press. If the dimensions of the mold halves change, due to unavoidably becoming cooler and hotter during the compression process, the strength of the container will be compromised and the surface will not be smooth and even. This is not a problem if the surface quality and the strength of the finished object is of no great importance, such as for packaging materials or disposable dishes, but where the strength and surface finish of the finished molded product is of great importance then this is a problem. In general it is difficult to achieve uniformity of strength and surface in pulp molded products, particularly in such products which are thin.

It is now possible to make a large volume lightweight shell of molded pulp with improved strength and smoothness using the mold halves and apparatus described and claimed in our co-pending patent application No. 1550864-1 entitled Pulp Molding Apparatus and Molds for Use Therein and with the lightweight 3-D shaped material described in our co-pending patent application No. 1550866-6 entitled Large Lightweight Molded Material and Method for its Manufacture.

Providing a coffin, which is lightweight, very strong, with smooth and even outer surface and above all is easy and inexpensive to manufacture has hitherto proved very difficult.

SUMMARY

This entire complex of problems listed above finds its solution in embodiments herein as defined in the appended main patent claims.

According to embodiments, a large lightweight molded coffin comprising an outer shell of molded pulp and a core material used as a reinforcing spacer material conforming to and adhering to the interior of the shell, and an inner shell made of molded pulp or a flexible paper based material adhering to the core spacer material is provided.

In embodiments, the spacer material may be a paper based honeycomb sheet of hexagonal cells.

In embodiments, the core spacer material may be made of a spacer structure of molded pulp.

In embodiments, the reinforcing spacer material may be made of Re-board®.

In embodiments, the Re-board®© spacer material may have only a single interior cover sheet.

In embodiments, the reinforcing spacer material may comprise hollow cells separated by walls substantially perpendicular to the shell.

In embodiments, the outer shell may be molded of pulp with a fire-retardant additive.

In embodiments, a coffin cover may also comprise an outer shell of molded pulp and a reinforcing spacer material.

In another aspect, a method of producing a molded coffin comprising a. Pressing slurried pulp between a first male mold half covered with elastomeric material and a second female mold half, and drying the material at elevated temperature under pressure, to form the molded pulp shell, b. providing a core spacer structure and gluing the reinforcing spacer structure to the interior of the molded pulp shell.

c. provide an inner shell made of molded pulp or another flexible paper based material and gluing it to the core spacer structure is provided.

In embodiments, methods may comprise admixing a measured amount of fire retardant to the slurried pulp and/or spraying a fire retardant to the surface of the shells.

In embodiments, methods may comprise admixing a measured amount of dry- and wet strength additive to the slurried pulp.

In embodiments, methods may comprise admixing a measured amount of hydrophobizing additive in the slurried pulp.

In embodiments, methods may comprise surface treating the outer layer of the coffin material with a hydrophobizing coating by spray or coating.

In embodiments, methods may comprise spraying an adhesive on the inner side of the shell in order to glue the spacer material to the shell.

In another aspect, a large lightweight coffin comprising a curved outer shell of molded pulp and a flexible core material used as a reinforcing flexible spacer conforming to and adhering to the interior of the shell, and an inner shell made of molded pulp or a flexible paper based material adhering to the core spacer material is provided.

In embodiments, the reinforcing flexible spacer may be a paper based honeycomb sheet of hexagonal cells.

In embodiments, the reinforcing flexible spacer may be a corrugated core structure.

In embodiments, the reinforcing flexible spacer may be made of a spacer structure of molded pulp.

In embodiments, the reinforcing flexible spacer may be made of Re-board®. fluted paperboard.

In embodiments, the Re-board® spacer may have only a single interior cover sheet.

In embodiments, the reinforcing flexible spacer may comprise hollow cells separated by walls substantially perpendicular to the shell.

In embodiments, the outer shell may be molded of pulp with a fire-retardant additive.

In embodiments, a coffin cover may also comprise an outer shell of molded pulp and a reinforcing spacer material.

According to another aspect, a method of producing a coffin comprising
a. Pressing slurried pulp between a first male metal mold half spray coated or cast with elastomeric material and a second female metal mold half, and drying the pulp slurry at elevated temperature under pressure, to form the curved molded pulp shell,
b. providing a flexible spacer structure and gluing it as the reinforcing flexible spacer to the interior of the curved molded pulp shell.
c. providing an inner shell made of molded pulp or another flexible paper based material and gluing it to the reinforcing flexible spacer is provided.

In embodiments, methods may comprise admixing a measured amount of fire retardant to the slurried pulp and/or spraying a fire retardant to the surface of the shells.

In embodiments, methods may comprise admixing a measured amount of dry- and wet strength additive to the slurried pulp.

In embodiments, methods may comprise admixing a measured amount of hydrophobizing additive in the slurried pulp.

In embodiments, methods may comprise treating the outer layer of the coffin material with a hydrophobizing coating by spray or coating.

In embodiments, methods may comprise spraying an adhesive on the inner side of the shell in order to glue the flexible reinforcing spacer to the shell.

BRIEF DESCRIPTION OF DRAWINGS

Embodiments herein will now be described in more detail with reference to the appended drawings, wherein.

DETAILED DESCRIPTION

Figure 1:
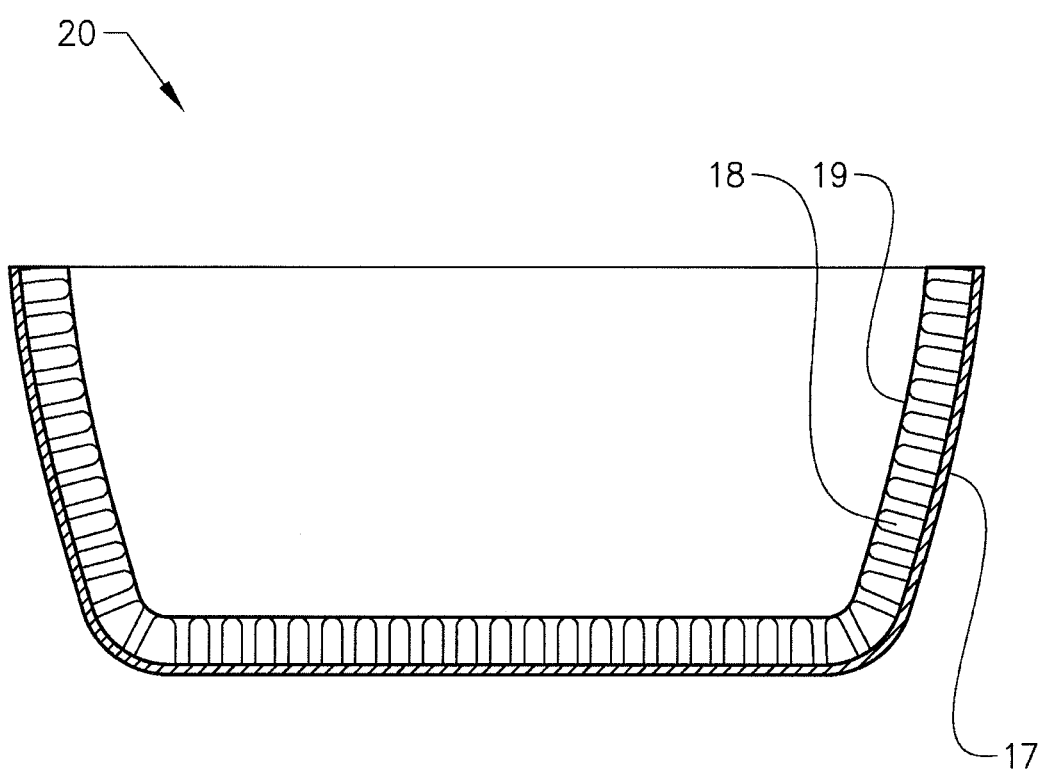
FIG. 1 shows a cross sectional view of a lower portion of a coffin according to embodiments herein.
Figure 2A:
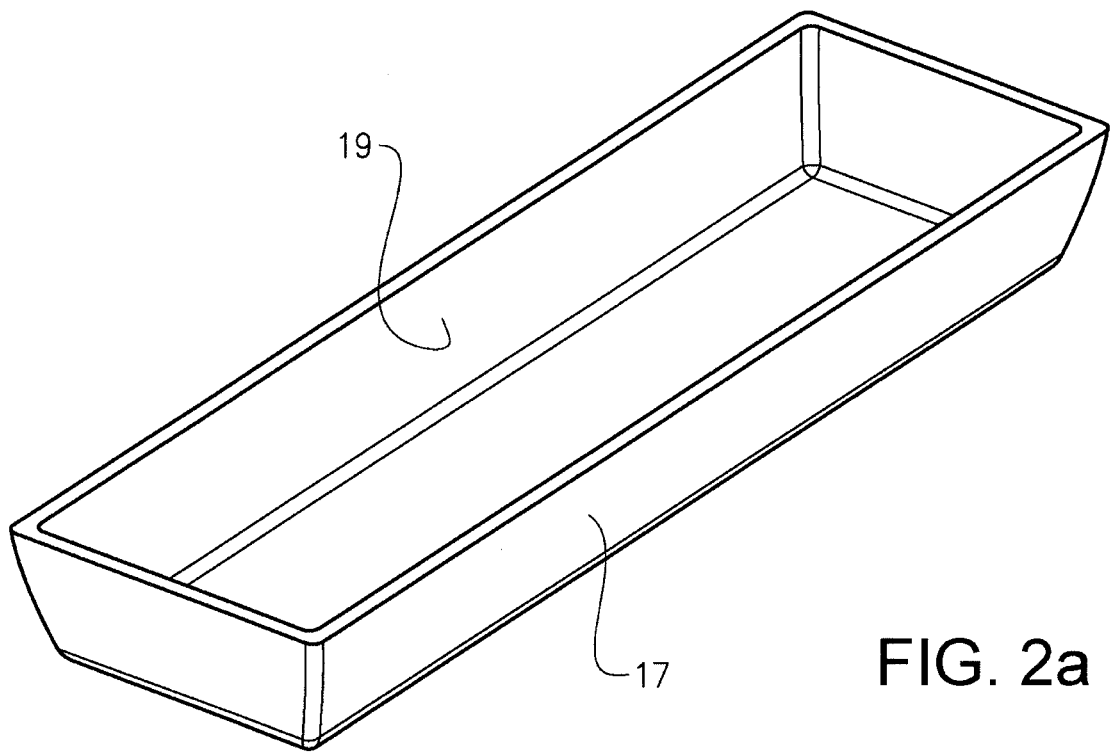
FIG. 2a shows a perspective view of the lower portion of the coffin shown in FIG. 1
Figure 2B:
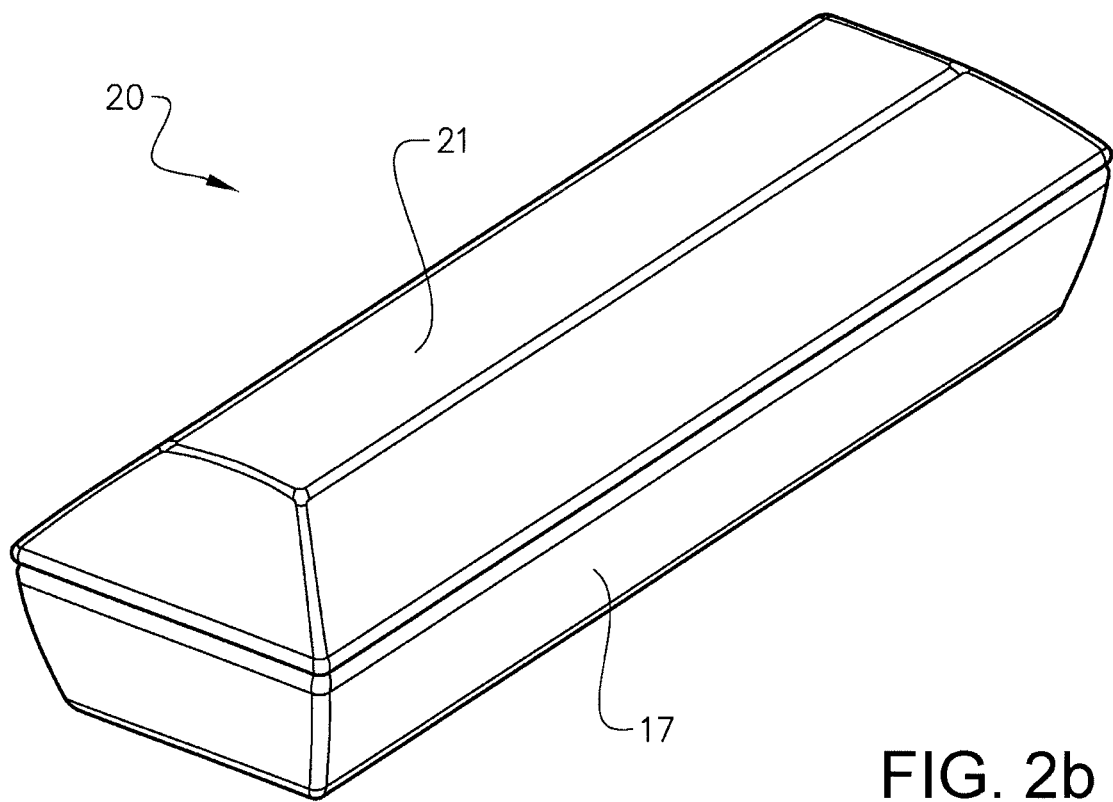
FIG. 2b shows a perspective view of the coffin provided with a lid.

The lower receptacle portion of a large lightweight molded coffin according to embodiments herein is shown in cross section in FIG. 1 and in perspective in FIG. 2(a). The complete coffin with a lid made in a similar manner of molded pulp is shown in FIG. 2b.

The lightweight material used in the coffin is built up as a sandwich construction by three different parts comprising:
  i) An outer shell 17 made of 3-D shaped molded pulp. [This is the surface of the material and will have a smooth and even surface and make possible complex 3-D shaped designs, produced, for example, by using the novel method for producing large molded pulp objects described in our co-pending Patent Application No. 1550864-1. entitled Pulp Molding Apparatus and Molds for Use Therein
  A core 18 composed of a flexible spacer structure that may have, but is not limited to having, a core of Re-board®, a paper honeycomb structure, a molded core structure (as described in e.g. International Patent Application No WO2010138066 A1), or the corrugated core structure made by fluting used in corrugated boards.
  ii) iii) An inner shell 19 made of molded pulp or a flexible paper based material such as a linerboard or paperboard.

By using a sandwich construction as described above, complex 3D-shaped designed coffins can be made while at the same time obtain a high strength material.

In one of embodiments herein, the outer shell 17 of the coffin is made of molded pulp and is lined in the embodiment shown with Re-board® with only a single linerboard, on its exposed interior surface 19. The Re-board® then composes both the core structure ii) above) and the inner shell (iii) above). As one of the linerboards has been removed from a normal Re-board® material, the Re-board® 18 can be bent, without breaking, to conform to the inside of the molded pulp shell 17 before being glued to the shell, which will then replace the missing linerboard of the reinforcing Re-board® spacer structure.

It is of course also possible to use other core materials used as spacers to line the outer molded pulp shell of the coffin that are able to conform to the interior curvature of the molded pulp shell. A honeycomb structure, having walls extending perpendicular to the surface of the shell is also one possible spacer material, as well as the corrugated core used in corrugated board, or pulp molded spacer material as described above, thereafter covered with another inner shell made of molded pulp of a paper based material in order to create a strong light weight material.

A number of special functional characteristics apply to coffins, in particular if they are intended for cremation. The specifications of a normal coffin are:

i) Have enough mechanical strength for carry a body weight of 120 kg.
ii) Have a dimensional stability and wet strength that enables storage in a freezer.
iii) Have water repellent properties to withstand rainy weather.
iv) If used in cremation, withstand the heat in a cremation oven (c 900° C.) for at least 15 sec. without catching fire.

A cardboard/reboard coffin can be expected to have exceptionally fast combustion. For safety of the crematorium workers and for optimum cremation of the body, according to one embodiment of embodiments herein, a measured amount of fire retardant is mixed into the slurry for making the molded pulp shell and/or sprayed on the surface of the molded shell(s) and the core spacer material. In order to make the molded shells stiff enough, dry strength additives are added to the pulp and in order to have enough wet strength enabling storage in a freezer, wet strength additives are added to the pulp in sufficient amount. To achieve enough water repellent properties on the outer shell, a hydrophobization additive is added to the pulp slurry. The hydrophobization may be even more increased by adding a hydrophobizing surface coating by using spray or a coating machine. There may also be adhesives sprayed on the inner surface(s) of the shell(s), which will make the core spacer material adhere to the shell(s) and become securely glued thereto.

The molded 3-D shaped material 17 has an even and smooth surface and good mechanical properties. The density of the molded materials needs to be at least 100 kg/m$^3$ in order to obtain proper stiffness but may be even higher depending on the pressure used during the molding process.

The molded material may be made of pulp from various fibers such as virgin wood fibers (e.g. chemothermo-mechanical pulp, chemical pulp or mechanical pulp), recycled wood fibers, textile fibers made of viscose, cotton or other cellulosic fibers, but may also be made of pulp comprising fibers mixed with thermoplastic fibers such as polylactic acid (as described in e.g. patent no EP2171154 A1) in order to create composite materials. FIG. 2a shows the lower receptacle portion 17 of a coffin according to embodiments herein, provided with an inner spacer structure and an inner shell 19. FIG. 2b shows a complete closed coffin according to embodiments herein with the lid 21 in place on the bottom portion of the coffin 20.

Figure 3:
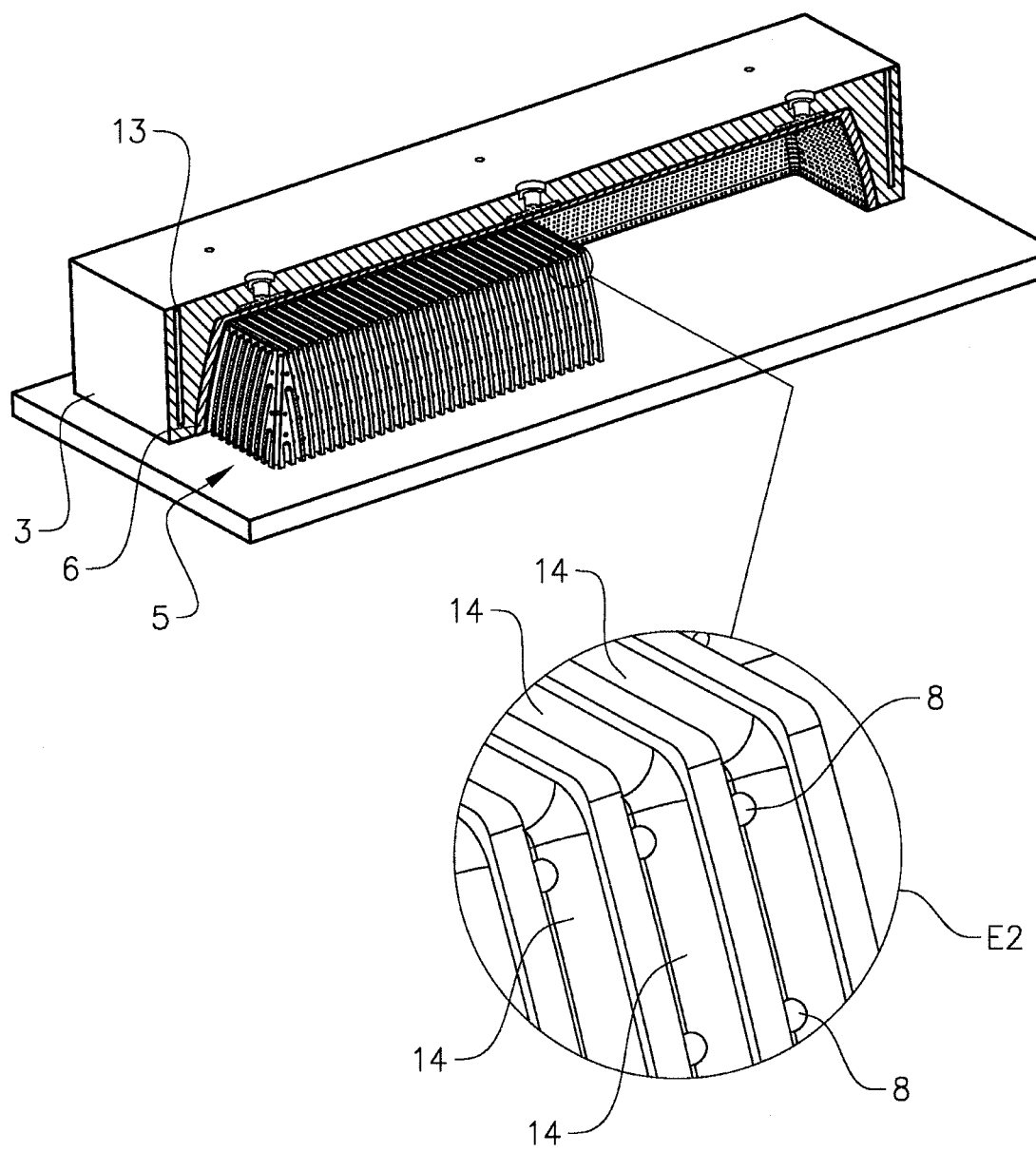
FIG. 3 shows schematically the pair of mold halves used in a method which can be used to manufacture the shells for a coffin according to embodiments herein.

FIG. 3 shows in longitudinal cutaway view a pair of mold halves used for manufacturing shells 17 for the reinforced coffins of embodiments herein. The male mold half 5 is made of hollow aluminum and is coated with an elastomer 6 which is ca 30 mm thick. This elastomer is preferably sprayed onto the aluminum mold half. It is also possible to cast the elastomer onto the aluminum mold half. A typical elastomer 6 should be hydrophobic but not be subject to hydrolysis. An advantageous hardness, particularly for a sprayed-on elastomer is 70 A-Shore, to provide optimal elastic properties. 5 mm diameter through-holes spaced 15 mm from each other cover the elastomer layer and connect to through-holes 8 in the aluminum body of the male mold half 5. Within the male mold half there is generated a vacuum of 0.5-0.9 bar. On top of the elastomer layer there is a wire mesh. In this case it is a 100 mesh (i.e. 100 threads per inch) and is approximately 1 mm thick. The wire mesh can also be laid in multiple layers which will further contribute to distributing the vacuum forces more evenly. The female mold-half 3 is made of aluminum and has in this example a weight of 700 kg. It is heated to ca. 200 degrees C., for example by means of heating rods embedded in the material of the female mold-half 3. This is the most energy effective method of heating the female mold-half. Its inner surface will create the outer surface of the product. The two mold halves can be made of porous aluminum to increase strength over sintered material and to increase heat conductivity.

The male mold-half 5 after being dipped in the slurry bath dewaters the slurry through vacuum to approximately 20% dryness (80% water) and the male mold-half 5 is then pressed into the female mold-half 3 down to a gap of ca. 1 mm between the two mold halves. It can vary for this particular product between ca. 0.8 and ca. 1.2 mm without detrimental effects. The material is then dried under pressure at an elevated temperature (>100 degrees, preferably 150 degrees). Due to absorbing coolness from the male mold-half 3 (temp of ca. 25° C.), the hot aluminum female mold-half 5 (initially ca. 200° C.) will in turn drop ca. 13 degrees C. during the compression process. This temperature change causes the female mold-half to shrink over its length approximately 7-8 mm with corresponding contractions in its width (2.5 mm) and height (1.5 mm). This is compensated for by the elastomer layer 6. The temperatures in both the female and male mold-halves will vary up and down during the compression process thus repeatedly changing slightly the dimensions on the molds. In conventional pulp molding processes, these dimensional variations would cause stresses and unevenness in the finished product, possibly even ruptures. In this particular exemplary product, without an elastomer layer, the temperature of the female mold-half must be rather precise, i.e. in this example between ca. 195° and 204° C. This precision is difficult to achieve and maintain in an industrial process of this type. These problems have been experienced even in the manufacture of relatively small pulp molded products, and require precise adjustment of the temperature to avoid them. Most pulp molded products, such as egg cartons, are several millimeters thick and are thus more porous and it makes no difference whether such products have a rough surface. A product with a rough surface cannot be used in many applications. For a large product, the problems of dimensional heat expansion/contraction will be greatly increased. These problems have hitherto made it impossible to manufacture large pulp molded products with reasonable reject rates and with a smooth surface.

Embodiments herein was developed inter alia in order to produce shells for coffins with very few rejects and no necessity of precisely monitoring and continually adjusting the temperatures of the two mold-halves. Since the elastomer is used to absorb much of the dimensional variation of the male and female mold-halves, they can be made much lighter and thinner than otherwise since they will not require a large mass to prevent temperature variations. For instance, in this example the female mold-half weighs ca. 750 kg. If it had to maintain a more constant temperature it might have to have a mass of several tons, requiring more energy to heat such a large mass and maintain the heat.

A coffin has in general curved sides, something which is expensive to produce in plywood or with wood planks. According to embodiments herein it is possible to produce shells of ca. 1-2 mm in thickness, which provides the maximum stiffness. Thicknesses greater or less than this thickness (1-2 mm) provide less stiffness These problems are solved by coating the surface of the male mold-half with an elastomeric material, onto which the wire mesh or meshes is/are then applied. This elastomeric material continually compensates for the varying dimensions of the two mold-halves during the compression/heating process.

It is also advantageous for molding the shell to mount the stationary mold half (in this case the female mold half) to be slightly horizontally moveable (+−25 mm) to make sure that any heating expansion will not prevent a correct horizontal alignment between the male and female mold halves during the pressing operation.

As can be seen in FIG. 3, the male mold half is provided with troughs 14 and large holes 8 beneath the elastomer layer in order to prevent any reduction of the vacuum which holds the pulp slurry and dewaters it on the surface of the wire mesh.

Other embodiments herein further describe a method to produce the molded lightweight coffin described above. The steps to produce the coffin comprises:

i) Provide a 3-D shaped molded material according to the design of the specific coffin by using the apparatus described above with or without addition of functional additives which will be used as outer shell 17 of the coffin ii) Provide a spacer material used as core 18 in the coffin material, and glue said core spacer material to the outer 3-D shaped molded shell iii) Provide an inner shell 19 made of a 3-D shaped molded material or a flexible paper based material which will adhere to the spacer material 18.

The invention claimed is:

1. A method of producing a coffin, comprising:
pressing slurried pulp to form a three-dimensionally curved molded pulp shell,
attaching a flexible spacer structure to the interior of said three dimensionally curved molded pulp shell, and
attaching an inner shell made of molded pulp or another flexible paper based material to said reinforcing flexible spacer.

2. The method of producing a coffin according to claim 1, further comprising admixing a measured amount of fire retardant to the slurried pulp and/or spraying a fire retardant to a surface of the three-dimensionally curved molded pulp shell.

3. The method of producing a coffin according to claim 1, further comprising admixing a measured amount of dry- and wet strength additive to the slurried pulp.

4. The method of producing a coffin according to claim 1, further comprising admixing a measured amount of hydrophobizing additive in the slurried pulp.

5. The method of producing a coffin according to claim 1, further comprising surface treating the exterior of the three-dimensionally curved molded pulp shell with a hydrophobizing coating by spray or coating.

6. The method of producing a coffin according to claim 1, wherein attaching the flexible spacer structure to the interior of said three-dimensionally curved molded pulp shell includes spraying an adhesive on the inner side of the three-dimensionally curved molded pulp shell.

7. The method of producing a coffin according to claim 1, wherein said flexible spacer structure is a paper based honeycomb sheet of hexagonal cells.

8. The method of producing a coffin according to claim 1, wherein said flexible spacer structure is a corrugated core structure.

9. The method of producing a coffin according to claim 1, wherein where said flexible spacer structure is a made of molded pulp.

10. The method of producing a coffin according to claim 1, wherein said flexible spacer structure is made of fluted paperboard.

11. The method of producing a coffin according to claim 10, wherein said fluted paperboard has only a single interior cover sheet.

12. The method of producing a coffin according to claim 1, wherein said flexible spacer structure comprises hollow cells separated by walls substantially perpendicular to said three-dimensionally curved molded pulp shell.

* * * * *